United States Patent
Sickon et al.

(10) Patent No.: US 9,227,526 B2
(45) Date of Patent: Jan. 5, 2016

(54) OCCUPANT DETECTION DEVICE WITH TEMPERATURE COMPENSATION

(71) Applicant: DELPHI TECHNOLOGIES, INC., Troy, MI (US)

(72) Inventors: Richard P. Sickon, Rochester Hills, MI (US); Gary M. Sobek, Royal Oak, MI (US)

(73) Assignee: Delphi Technologies, Inc., Troy, MI (US)

( * ) Notice: Subject to any disclaimer, the term of this patent is extended or adjusted under 35 U.S.C. 154(b) by 66 days.

(21) Appl. No.: 14/191,636

(22) Filed: Feb. 27, 2014

(65) Prior Publication Data

US 2015/0239367 A1    Aug. 27, 2015

(51) Int. Cl.

| G08B 21/00 | (2006.01) |
| B60Q 1/00 | (2006.01) |
| B60N 2/00 | (2006.01) |
| G01G 3/18 | (2006.01) |
| G01G 19/414 | (2006.01) |
| G01G 23/48 | (2006.01) |

(52) U.S. Cl.
CPC ........ *B60N 2/002* (2013.01); *G01G 3/18* (2013.01); *G01G 19/4142* (2013.01); *G01G 23/48* (2013.01)

(58) Field of Classification Search
None
See application file for complete search history.

(56) References Cited

U.S. PATENT DOCUMENTS

| 4,561,677 A * | 12/1985 | Kawai ........................ 280/804 |
| 4,715,096 A * | 12/1987 | Fleming et al. ................ 24/602 |
| 4,951,764 A * | 8/1990 | Brand ........................ 177/210 C |
| 6,820,896 B1 * | 11/2004 | Norton ........................... 280/735 |
| 2004/0140137 A1 | 7/2004 | Selig et al. |
| 2004/0154843 A1 | 8/2004 | Aumer et al. |
| 2005/0061643 A1 * | 3/2005 | Rainey ........................ 200/85 A |
| 2005/0066748 A1 * | 3/2005 | Senoo et al. ............. 73/862.045 |
| 2005/0067828 A1 * | 3/2005 | Norton ........................... 280/806 |
| 2006/0042852 A1 * | 3/2006 | Hetzenecker .......... B60N 2/002 180/271 |
| 2006/0103192 A1 * | 5/2006 | Norton ........................ 297/217.2 |
| 2006/0267321 A1 * | 11/2006 | Harish et al. .................. 280/735 |
| 2008/0204263 A1 | 8/2008 | Krempl et al. |
| 2012/0176609 A1 * | 7/2012 | Seppa et al. .................. 356/227 |
| 2012/0262241 A1 * | 10/2012 | Phan Le et al. ................ 331/154 |
| 2014/0034266 A1 * | 2/2014 | Tabei et al. ..................... 165/42 |
| 2014/0246887 A1 * | 9/2014 | Clos ........................ G01L 1/04 297/217.3 |

FOREIGN PATENT DOCUMENTS

| DE | 101 20 977 A1 | 11/2002 |
| DE | 101 45 369 A1 | 4/2003 |
| EP | 1 434 042 A1 | 6/2004 |
| FR | 2 952 868 A1 | 5/2011 |

OTHER PUBLICATIONS

European Search Report dated Jul. 10, 2015.

* cited by examiner

Primary Examiner — Julie Lieu
(74) Attorney, Agent, or Firm — Lawrence D. Hazelton

(57) ABSTRACT

An occupant detection device for a vehicle seat is provided. The device includes a sensor and a spring. The sensor is configured to indicate a first state when a seat is not occupied and a second state when the seat is occupied. The spring is configured to urge the sensor toward the first state. The spring is also configured to provide a return force that varies with a temperature of the spring.

6 Claims, 2 Drawing Sheets

OCCUPANT DETECTION DEVICE WITH TEMPERATURE COMPENSATION

TECHNICAL FIELD OF INVENTION

This disclosure generally relates to an occupant detection device for a vehicle seat, and more particularly relates to a spring in the device that is configured to provide a return force that varies with a temperature of the spring.

BACKGROUND OF INVENTION

It is known to equip vehicle seat assemblies with occupant detection devices in order to, for example, classify the occupant as an adult or a child, or to remind the occupant if the seat belt is not properly fastened. However, it has been observed that the weight threshold applied to the seat that is necessary for an occupant detection device to switch from indicating that the seat is unoccupied to indicating that the seat is occupied varies with ambient temperature. For example, it has been observed that some seat configurations cause the threshold to increase as the temperature decreases. However, it has also been observed that some seat configurations cause the threshold to decrease as the temperature increases.

SUMMARY OF THE INVENTION

In another embodiment, an occupant detection device for a vehicle seat is provided. The device includes a sensor and a spring. The sensor is configured to indicate a first state when a seat is not occupied and a second state when the seat is occupied. The spring is configured to urge the sensor toward the first state. The spring is also configured to provide a return force that varies with a temperature of the spring.

In yet another embodiment, a vehicle seat assembly configured to detect the presence of an occupant is provided. The assembly includes a sensor and a spring. The sensor is configured to indicate a first state when the assembly is not occupied and a second state when the assembly is occupied. The spring is configured to urge the sensor toward the first state. The spring is also configured to provide a return force that varies with a temperature of the spring.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
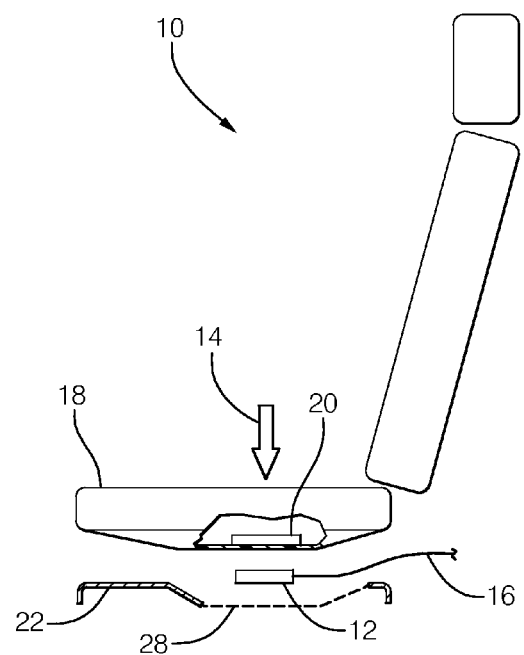
FIG. 1 is an exploded side view of a vehicle seat assembly equipped with vehicle seat occupant detection device in accordance with one embodiment.

FIG. 1 illustrates a non-limiting example of a vehicle seat assembly, hereafter referred to as the assembly 10, suitable for use in a vehicle such as an automobile. The assembly 10 is equipped with a vehicle seat occupant detection device, hereafter referred to as the device 12. In general, the device 12 is configured to indicate if a seat (i.e. the assembly 10) of a vehicle is occupied based on a weight 14 of an occupant (not shown) occupying the seat. Alternatively, the device 12 is configured to indicate if a seat (i.e. the assembly 10) of a vehicle is not occupied based on a weight 14 of an object (i.e. groceries) occupying the seat. Typically, the device 12 is coupled to an electrical system (not shown) of a vehicle via a wire harness 16. Signals from the device 12 may be used by the vehicle electrical system or occupant protection system to, for example, determine if an airbag should be deployed in the event of a vehicle collision, or convey a reminder to the occupant of the seat to fasten a seat belt (not shown).

The illustration of FIG. 1 is shown as an exploded view for the convenience of explanation. In this non-limiting example, a cushion 18 of the assembly 10 is configured to define a pocket 20 in which the device 12 resides when the cushion 18 is placed upon (i.e.—is in contact with) a frame 22 of the assembly 10. By way of example and not limitation, if the assembly 10 is unoccupied, the device 12 outputs on the wire harness 16 a signal that indicates an unoccupied state. If an occupant or object with the weight 14 above some predetermined threshold resides on the assembly 10, the device 12 outputs on the wire harness 16 a signal that indicates an occupied state. Alternatively, if an object with the weight 14 below some predetermined threshold resides on the assembly 10, the device 12 outputs on the wire harness 16 a signal that indicates an unoccupied state.

Figure 2:
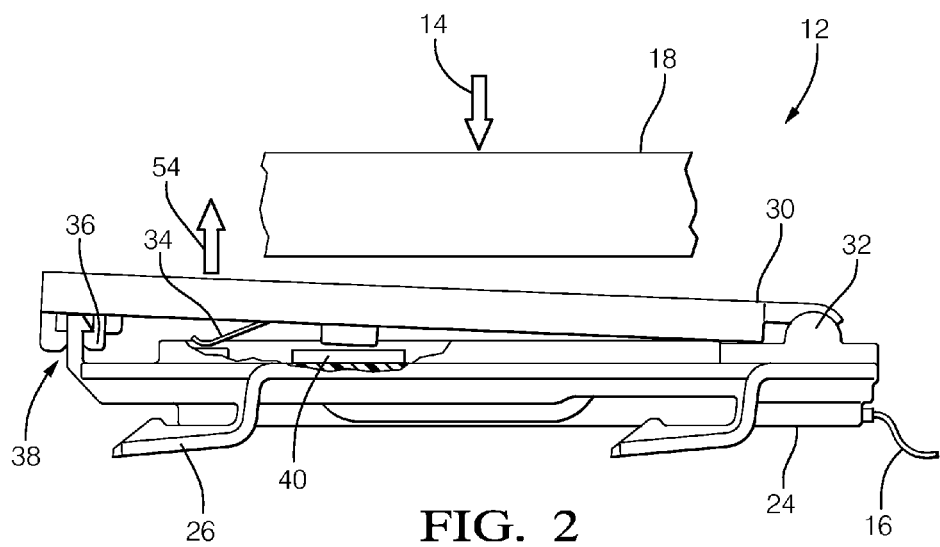
FIG. 2 is a side view of the vehicle seat occupant detection device of FIG. 1 in accordance with one embodiment.

FIG. 2 illustrates a non-limiting example of the device 12. The device 12 may include a housing 24 that defines tabs 26 that cooperate with a wire portion 28 of the frame 22 to secure the device 12 to the frame 22. In this example, the device 12 includes a cover 30 coupled to the housing 24 by a hinge 32.

The device 12 includes a spring 34 configured to urge the device 12 toward an unoccupied state. The amount of urging by the spring 34 (i.e. the distance urged by the spring) may be limited by, for example, an arrangement of a hook 36 and a slot 38, the configuration of which will be recognized by those in the art. By this arrangement, various electrical components or other parts can be conveniently assembled to the housing 24 or the cover 30 before the hook 36 is engaged with the slot 38, i.e. while the device 12 is 'open'.

The device 12 also includes a sensor 40 configured to determine an amount of deflection of the cover 30 relative to the housing 24, thereby deflecting or compressing the spring 34. The deflection is presumably caused by the weight 14 being applied to the device 12 through the cushion 18 with a countering force being provided by the frame 22. As such, the sensor 40 is configured or adapted to output a signal indicative of a weight 14 of an occupant residing on the seat (the assembly 10). In one embodiment, the sensor 40 is a linear type sensor so that the value of the signal on the wire harness 16 is indicative of the weight 14. Alternatively, the sensor may be a switch so that the signal on the wire harness indicates if the weight 14 is greater than or less than some predetermined threshold. The sensor 40 may advantageously be an inductive sensor or a capacitive sensor so that the sensor 40 is able to directly measure or detect the relative proximity of the spring 34. By way of example and not limitation, a suitable example of the sensor 40 is the Inductance-to-Digital convertor model LDC1000 available from Texas Instruments of Dallas, Tex., USA.

It has been observed that in some instances the threshold of the weight 14 necessary for the device 12 to indicate that the seat is occupied varies with temperature. While not subscribing to any particular theory, it is believed that in some instances this effect is caused by the durometer (i.e. the stiffness or hardness) of the cushion 18 changing with temperature. For example, if the durometer increases as temperature decreases, the amount of force applied to the device 12 by a given amount of the weight 14 decreases because the stiffer cushion better supports the weight. Alternatively, if the durometer decreases as temperature increases, the amount of force applied to the device 12 by a given amount of weight 14 increases because the more flexible cushion supports less weight.

Figure 3:
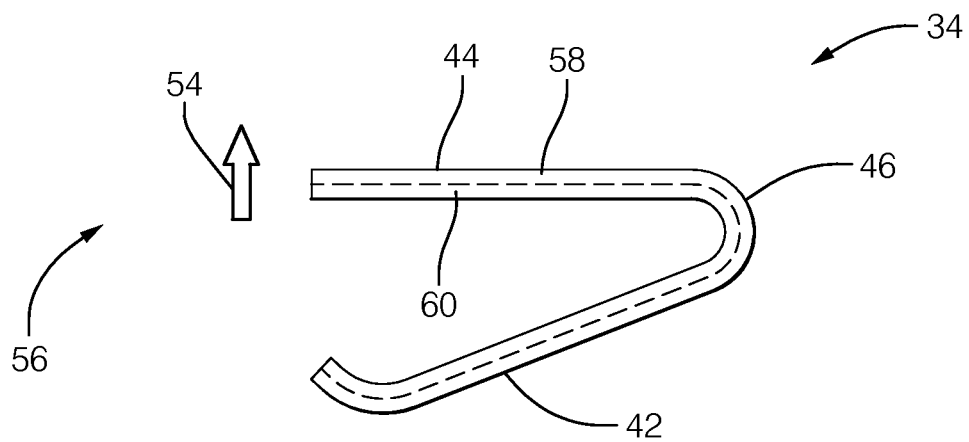
FIG. 3 is a side view of a spring of the vehicle seat occupant detection device of FIG. 1 in accordance with one embodiment.

FIG. 3 illustrates a non-limiting example of the spring 34. It was recognized that this variation in threshold due to changes in temperature could be reduced by forming or configuring the spring 34 to provide a return force 54 that varies with a temperature 56 of the spring 34. That is, as the temperature 56 of the spring 34 varies, the amount or the value of the return force 54 provided by the spring 34 changes. Prior testing of occupant detection devices that did not have a temperature compensated spring indicated that the weight 14 applied to the cushion 18 sufficient to indicate that the assembly 10 was occupied increased as temperature decreased. Accordingly, for the particular seat assembly tested, it would be advantageous if the spring 34 decreased the return force 54 as the temperature 56 decreased.

By way of example and not limitation, the spring 34 may be formed of two layers of distinct metals characterized as having distinct coefficients of thermal expansion (CTE). To provide a return force 54 that decrease as the temperature 56 decreases, the spring 34 may be formed of a first layer 58 of material (e.g. a first metal alloy) that has a first CTE less than a second CTE of a second layer 60 of the spring 34. Accordingly, the spring 34 may be characterized as a bi-metal spring. For example, the first layer 58 may be formed of a relatively low thermal expansion allow such as 36% Ni, and 64% Fe with a thickness of 0.10 millimeters (mm), and the second layer 60 may be formed of a relatively high thermal expansion allow such as 22% Ni, 3% Cr, and 75% Fe with a thickness of 0.10 mm. The first layer 58 and the second layer 60 may be bonded together using a cladding process, and then cut and formed to fabricate the spring 34. The spring 34 may include other layers to prevent corrosion or reduce friction, as will be recognized by those in the art.

By way of further example, the spring 34 may be characterized as a cantilever type spring that includes a beam portion 42 coupled to a base portion 44 by a hinge portion 46. It will be recognized by those in the art that other configurations of a return spring for an occupant protection device may be suitable.

Figure 4:
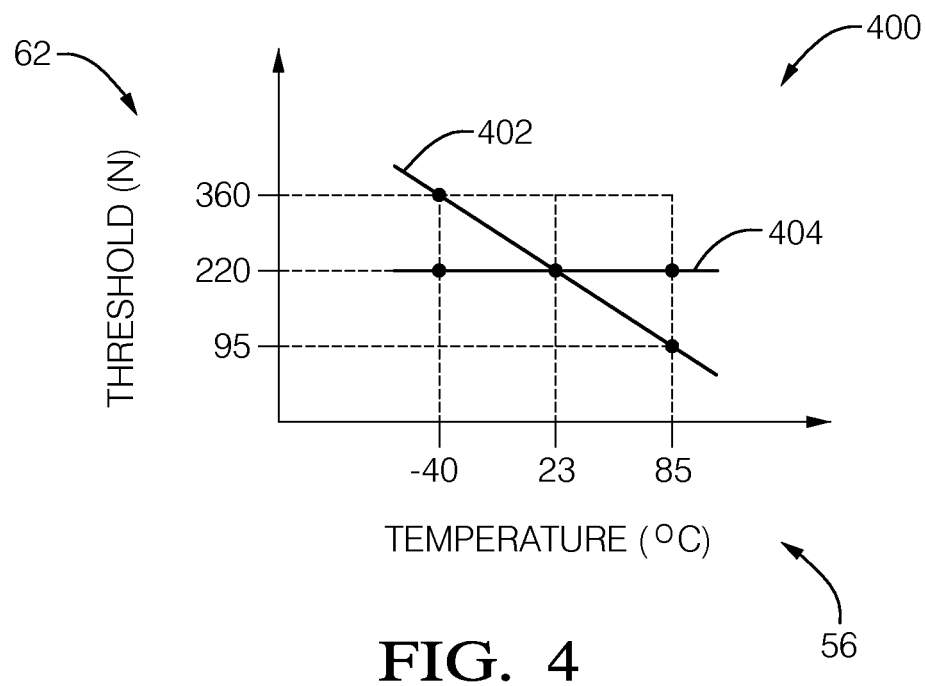
FIG. 4 is a graph of weight threshold versus ambient temperature of the seat assembly of FIG. 1 in accordance with one embodiment.

FIG. 4 illustrates a non-limiting example of a graph 400 of a threshold 62 versus the temperature 56. As used herein, the threshold 62 corresponds to the weight 14 applied to an exemplary seat assembly (the assembly 10) when the device 12 changes from indicating that the assembly 10 is not occupied to occupied, or the reverse. The threshold 62 may be detected directly by the sensor 40 if the sensor 40 is a switch operable to an open state and a closed state, or may be determined by other electronics within or outside of the device 12 if the sensor 40 is a linear detector configured to output a variable signal corresponding to or indicative of the weight 14 of an occupant residing on the seat (i.e. the assembly 10).

The graph 400 illustrates first data 402 of the threshold 62 when the device 12 is equipped with a spring that does not provide a return force that varies with a temperature of the spring. That is, a spring that provides a return force that does not vary with temperature. As can be seen, as described above, the threshold 62 indicated by the first data 402 increases with decreasing temperature. The effect is that a person is detected when the temperature is 23° C. may not be detected when the temperature is −40° C. Similarly, the threshold 62 indicated by the first data 402 decreases with increasing temperature. The effect is that an object (i.e. groceries) is not detected when the temperature is 23 C may be detected when the temperature is 85 C. The graph 400 also illustrates second data 404 of the threshold 62 when the device 12 is equipped with a spring that does provide a return force 54 that varies with a temperature of the spring 34. That is, the spring 34 provides a return force 54 that does vary with the temperature 56. As can be seen, the threshold 62 indicated by the second data 404 does not substantially change with the temperature 56. The effect is that a person is detected when the temperature is 23° C. is detected when the temperature is −40° C. Similarly, the effect is that an object (i.e. groceries) is not detected when the temperature is 23 C is also not detected when the temperature is 85 C.

Accordingly, a vehicle seat assembly (the assembly 10) and an occupant detection device (the device 12) are provided. The device 12 includes a spring 34 configured to provide a return force 54 that varies with the temperature 56 of the spring 34. Such temperature dependent spring provides compensation for variations in stiffness or durometer of materials or other features of a vehicle seat assembly that affect the threshold 62 of the weight 14 applied to the assembly 10 used to classify an occupant of the seat as, for example, a child or an adult.

While this invention has been described in terms of the preferred embodiments thereof, it is not intended to be so limited, but rather only to the extent set forth in the claims that follow.

We claim:

1. An occupant detection device for a vehicle seat, said device comprising:
   a sensor configured to indicate a first state when a seat is not occupied and a second state when the seat is occupied, wherein the seat is characterized by a stiffness that changes with temperature;
   a spring configured to urge the sensor toward the first state, wherein the spring is configured to provide a return force that varies with a temperature of the spring effective to compensate for changes in the stiffness of the seat due to changes in temperature of the seat; and
   wherein the spring is characterized as a bi-metal spring.

2. The device in accordance with claim 1, wherein the spring is characterized as a cantilever type spring that includes a beam portion coupled to a base portion by a hinge portion.

3. The device in accordance with claim 1, wherein the sensor comprises a switch operable to an open state and a closed state.

4. The device in accordance with claim 1, wherein the sensor comprises a linear detector configured to output a variable signal indicative of a weight of an occupant residing on the seat.

5. The device in accordance with claim 1, wherein the device is part of a seat belt reminder system in a vehicle.

6. A vehicle seat assembly configured to detect the presence of an occupant, wherein the seat is characterized by a stiffness that changes with temperature, said assembly comprising:
   a sensor configured to indicate a first state when the assembly is not occupied and a second state when the assembly is occupied;
   a spring configured to urge the sensor toward the first state, wherein the spring is configured to provide a return force that varies with a temperature of the spring effective to compensate for changes in the stiffness of the seat due to changes in temperature of the seat; and wherein the spring is characterized as a bi-metal spring.

\* \* \* \* \*